United States Patent
Gordon et al.

[15] 3,698,613
[45] Oct. 17, 1972

[54] STRIP ACCUMULATOR

[72] Inventors: Howard W. Gordon; James N. Shepard, both of Concord, Calif.

[73] Assignee: United States Steel Corporation

[22] Filed: Jan. 15, 1971

[21] Appl. No.: 106,831

[52] U.S. Cl. ............226/118, 226/189, 287/58 CT, 248/333
[51] Int. Cl. ..............................................B65h 17/42
[58] Field of Search ..226/118, 189, 119; 287/58 CT; 248/333

[56] References Cited

UNITED STATES PATENTS 925,448  6/1909  Boyden..................287/DIG. 6
2,771,984  11/1956  Ranney..................226/119 X

*Primary Examiner*—Allen N. Knowles
*Attorney*—Martin J. Carroll

[57] ABSTRACT

A strip accumulator including fixed rolls, a vertically movable carriage with a plurality of rolls thereon, the strip passing alternately around the fixed and carriage rolls, and a chain at each corner of the carriage for moving it vertically has novel means for leveling the carriage. The leveling means includes a female threaded member secured to each corner of the carriage, an elongated male threaded member threaded into each female member, and a rod movable with each male member having its ends connected to the ends of the associated chain.

6 Claims, 3 Drawing Figures

INVENTORS
HOWARD W. GORDON
& JAMES N. SHEPARD

By Martin J. Carroll
Attorney

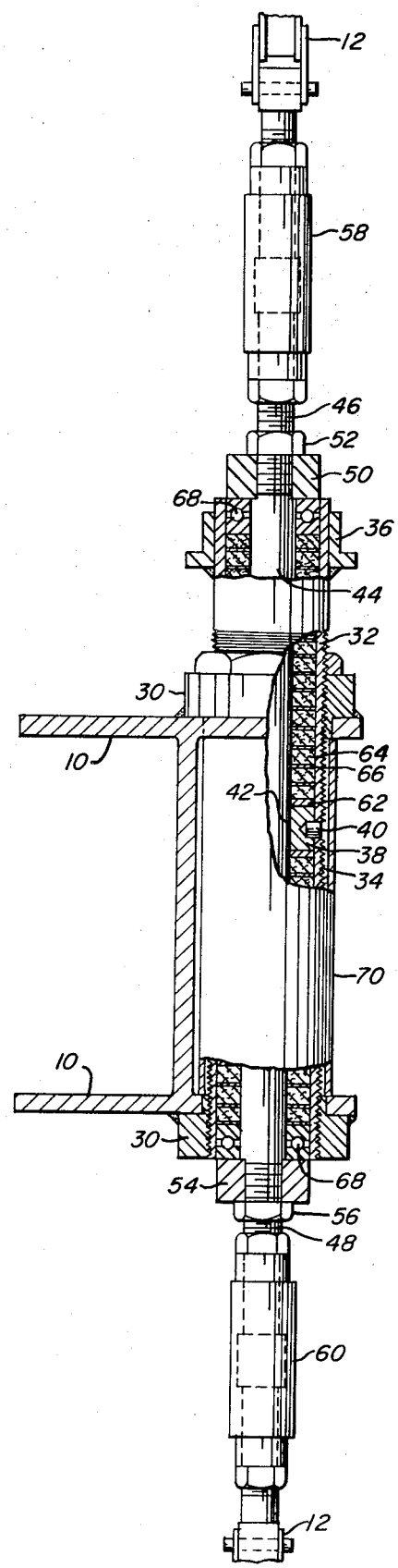

STRIP ACCUMULATOR

This invention relates to a leveling device for an accumulator carriage and more particularly to an entry accumulator for a strip processing line such as a continuous annealing line. The strip, prior to annealing, is full hard steel strip and is difficult to track. The accumulator or looping tower includes a series of fixed rolls having their axes parallel to one another in a horizontal plane and another series of rolls mounted on a traveling carriage which moves up and down depending upon the amount of strip accumulated. The strip passes around the top and bottom rolls alternately and if the rolls on the traveling carriage are not level strip will track to one side of the rolls and may cause a strip break or cobble which requires shutting down the line. At best this requires time to fasten the ends of the strip together and if the repair cannot be made very promptly there will be a substantial loss of product due to overheating or improper heating and cooling of the strip already in the line. In one type of accumulator the carriage is moved up and down by means of four drive chains, one at each corner of the carriage. The ends of each chain are attached to the carriage. The length of the drive chains will vary due to normal wear so that periodic leveling of the carriage is necessary. For example, it is common to level the carriage about three times a month. Prior to our invention leveling of the carriage was a difficult and time consuming operation and the operation did not always result in a level carriage.

It is therefore an object of our invention to provide an accumulator having incorporated therein means for rapidly and accurately leveling its movable carriage.

This and other objects will be more apparent after referring to the following specification and attached drawings, in which:

FIG. 3 is an enlarged view, partly in section, of the leveling device of our invention.

Figure 1:
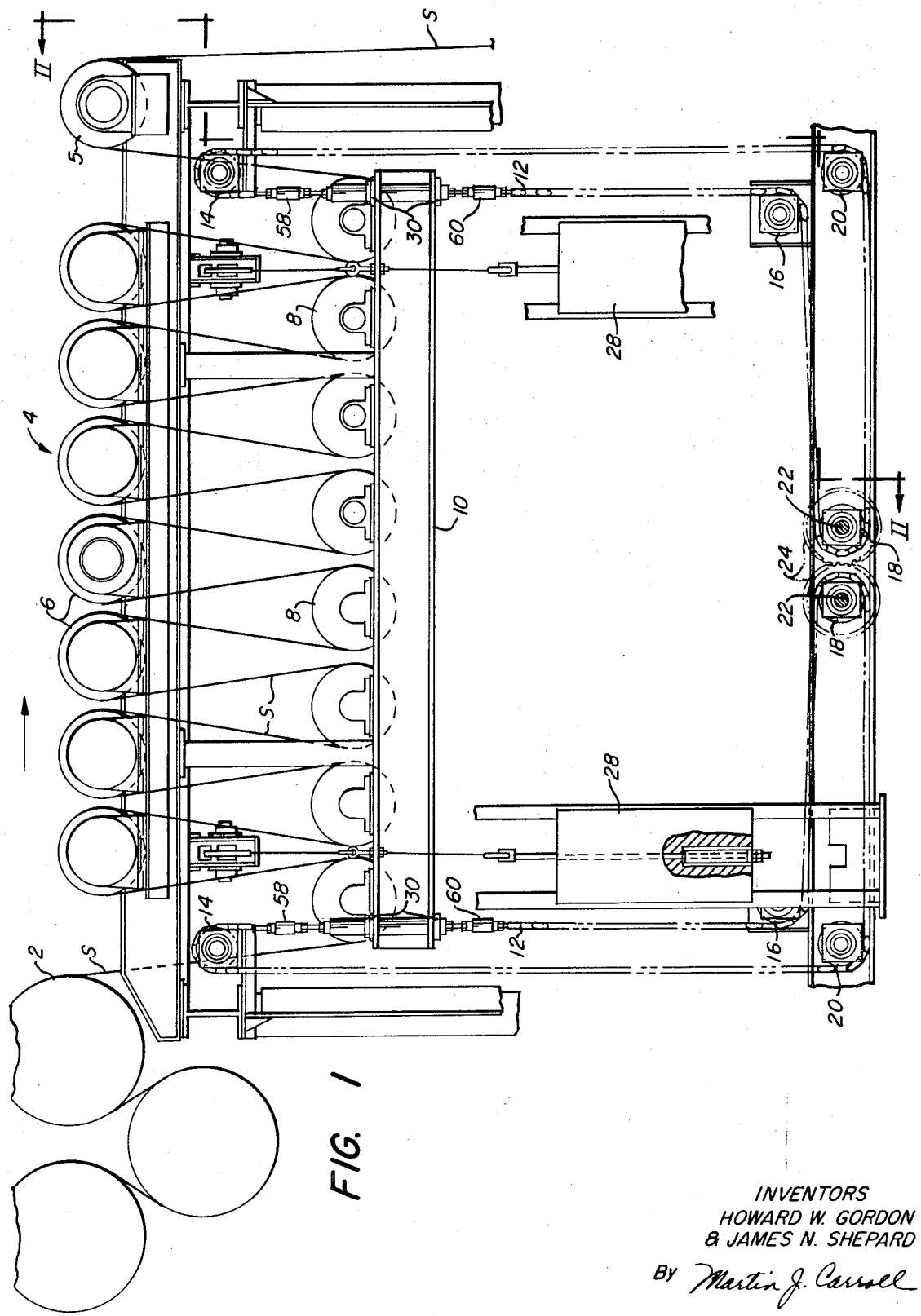
FIG. 1 is a schematic elevation of a strip accumulator utilizing our invention.
Figure 2:
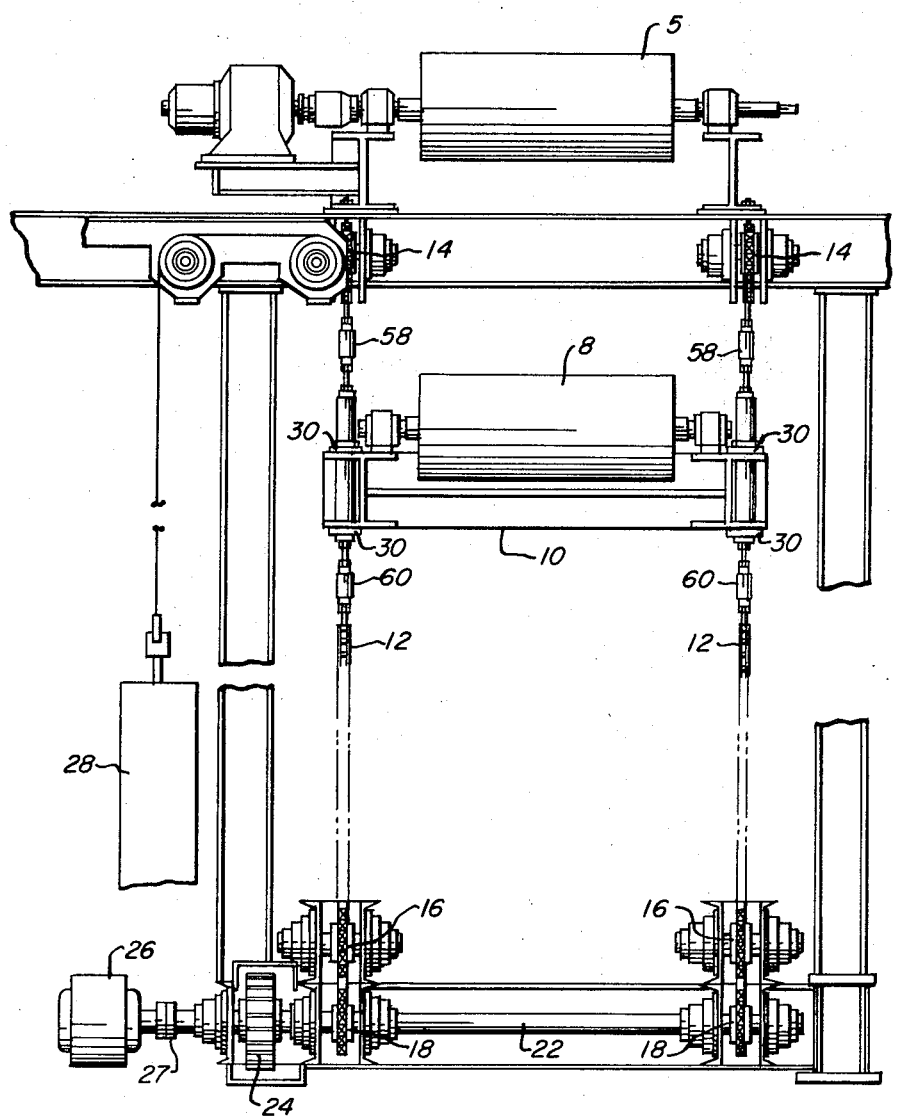
FIG. 2 is a view taken on the line II—II of FIG. 1.

Referring more particularly to the drawings, reference numeral 2 indicates the entry bridle rolls of a strip processing line such as a continuous annealing line. Strip S passes over and around the bridle rolls 2 to a looping tower or accumulator 4 and passes from the accumulator over an exit roll 5. The accumulator 4 includes a plurality of fixed rolls 6 which are mounted with their axes parallel to one another in a horizontal plane. Similar rolls 8 are mounted on a movable carriage 10 beneath the rolls 6 with their axes parallel to the axes of rolls 6. The strip S passes downwardly from entry bridle rolls 2 to the first of the rolls 8, then upwardly around the first of the rolls 6 and then alternately around the remaining rolls 8 and the remaining rolls 6. The carriage 10 is moved upwardly and downwardly by means of four chains 12, one attached to each corner of the carriage 10. Each drive includes a top sprocket 14 and bottom sprockets 16, 18 and 20. The two sprockets 18 for each end of the carriage are mounted on a common shaft 22. Each shaft 22 has a gear 24 mounted thereon in mesh with one another. The gears 24 are rotated by means of a motor 26 which drives one of the shafts 22 through coupling 27. The carriage 10 is counterweighted by means of counterweights 28 so that only enough force is required to overcome friction and the weight of the strip. During normal operation the carriage 10 is in its lower position so that the maximum amount of strip S is in the accumulator. When it is necessary to introduce another coil of strip into the system the motor 26 is operated to gradually raise the carriage 10. This permits the strip to move continuously through the processing line, such as the heating and cooling zones of a continuous annealing line while the leading end of a new coil of strip is being secured to the trailing end of the strip already in the line. After being secured the strip is fed into the accumulator faster than it is removed and the motor 26 is operated to gradually lower the carriage 10 to its lowest position. The construction and operation so far described are conventional.

According to our invention we attach nuts 30 to the top and bottom of the carriage 10 in axial alignment with each of the chains 12. A sleeve 32 having external threads 34 is threaded through the nuts 30. The sleeve 32 has a hexagon projection 36 attached to its upper end so that the sleeve 32 can be rotated by means of an open end wrench. A bulkhead 38 is secured to the inside of sleeve 32 intermediate its ends by means of pins 40 passing through aligned holes in the sleeve 32 and bulkhead 38. An axial opening 42 is provided in the bulkhead 38 and a rod 44 passes through the sleeve 32 and hole 42. The rod 44 has a threaded upper end 46 and a threaded lower end 48. Nuts 50 and 52 are threaded on the threads 46 and nuts 54 and 56 threaded on the threads 48.

The threaded upper end 46 is threaded into a turnbuckle 58 and the threaded lower end 48 is threaded into turnbuckle 60. The turnbuckles 58 and 60 are connected to the ends of the chain 12 as in prior installations. A brass washer 62 is arranged on each side of the bulkhead 38 with a compressible washer 64 adjacent each washer 62. The washer 64 may be made of any suitable material such as that sold under the trade name Fabreeka which consists of tightly twisted, closely woven lightweight cotton duck impregnated with a rubber compound and is manufactured by Fabreeka Products Company of Boston, Massachusetts. A steel washer 66 abuts each of the washers 64 and a plurality of washers 64 are arranged alternately with steel washers 66 to a position a short distance from each end of sleeve 32. A thrust bearing 68 is arranged around the rod 44 at each end of sleeve 32 and holds the washers 64 and 66 in place. The bearings 68 in turn are held in place by means of nuts 50 and 54. If desired, the threads of sleeves 32 may be protected from deformation from outside forces by means of a tubular shroud 70 surrounding the outside of each sleeve and welded to the carriage 10.

In operation, the tension of each chain 12 is adjusted by turning the turnbuckles 58 and/or 60. The carriage 10 is leveled by rotating sleeve 32 within the nuts 30. It is clear that rotation of the sleeve 32 will cause the carriage 10 to move with respect to the chain 60 thereby raising or lowering the adjacent part of the carriage 10. Since the position of each corner of the carriage can be individually adjusted, it is possible to quickly level the carriage. This can be done by conforming three corners of the accumulator to the other corner. When the leveling is completed the sleeves 32 are locked in position by tightening lock nuts 52 and 56. One man can level the carriage in about five minutes, while it required two men approximately one hour to level the carriage with the previous construction.

While one embodiment of our invention has been shown and described, it will be apparent that other adaptations and modifications may be made without departing from the scope of the following claims.

We claim:

1. In an accumulator having a movable carriage, a plurality of chains for moving the carriage, and means for securing the ends of each chain to the carriage in spaced apart relationship; the improvement in said securing means comprising a female threaded member secured to said carriage, an elongated male threaded member threaded into said female threaded member, and elongated means movable with said male threaded member and having each of its ends secured to the ends of the associated chain.

2. The combination of claim 1 in which said male threaded member has an axial opening therethrough, and said means movable with said male threaded member is a rod extending through said axial opening.

3. The combination of claim 2 including a bulkhead secured to the inside of said male threaded member intermediate its ends, a pair of thrust bearings in said axial opening one at each end thereof, and a plurality of washers in said axial opening between said bulkhead and said bearings, at least some of said washers being compressible.

4. The combination of claim 3 in which alternate washers are compressible and the other washers solid.

5. The combination of claim 4 including threaded ends on said rod extending beyond the ends of said male threaded member, and a turnbuckle secured to each threaded end and to the adjacent end of the associated chain.

6. The combination of claim 5 including a chain at each of four corners of the carriage.

* * * * *